(12) United States Patent
Bridges et al.

(10) Patent No.: US 7,110,768 B1
(45) Date of Patent: Sep. 19, 2006

(54) MEASUREMENT AND ANTENNA PLACEMENT TOOL FOR ESTABLISHING A CELL SITE

(75) Inventors: Sydney D. Bridges, Middletown, NJ (US); Charles Michael DeSantis, Neptune, NJ (US); Jane Klein, Perrineville, NJ (US); Steve J. Nossen, Somerset, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/455,019

(22) Filed: Dec. 6, 1999

(51) Int. Cl.
*H04Q 7/20* (2006.01)

(52) U.S. Cl. .................. 455/446; 455/67.11; 455/67.14

(58) Field of Classification Search ................. 455/423, 455/446, 421, 67.1, 422, 67.3, 67.4, 67.7, 455/522, 517, 443, 444, 449, 525; 465/423–425; 714/701
See application file for complete search history.

(56) References Cited

U.S. PATENT DOCUMENTS

| | | | | |
|---|---|---|---|---|
| 4,955,083 A * | 9/1990 | Phillips et al. | ................. | 455/47 |
| 5,115,233 A * | 5/1992 | Zdunek et al. | ............... | 370/348 |
| 5,398,276 A * | 3/1995 | Lemke et al. | .................. | 379/21 |
| 5,425,076 A * | 6/1995 | Knippelmier | ............ | 379/27.04 |
| 5,451,839 A * | 9/1995 | Rappaport et al. | ........... | 375/224 |
| 5,463,673 A * | 10/1995 | Herscovici | .................. | 455/446 |
| 5,479,474 A * | 12/1995 | Schwartzman et al. | ...... | 455/570 |
| 5,539,803 A * | 7/1996 | Bhat et al. | ..................... | 379/21 |
| 5,875,398 A * | 2/1999 | Snapp | ......................... | 455/424 |
| 5,926,762 A * | 7/1999 | Arpee et al. | ................. | 455/447 |
| 5,991,901 A * | 11/1999 | Mulford et al. | ............. | 714/704 |
| 6,006,089 A * | 12/1999 | Sasaki et al. | ................ | 455/423 |
| 6,081,717 A * | 6/2000 | Shah et al. | .................. | 455/446 |
| 6,128,494 A * | 10/2000 | Rozmaryn | .................. | 455/436 |
| 6,148,194 A * | 11/2000 | Kao et al. | .................... | 455/421 |
| 6,181,917 B1 * | 1/2001 | Mansour et al. | .............. | 455/63 |
| 6,272,337 B1 * | 8/2001 | Mount et al. | ............... | 455/423 |
| 6,304,754 B1 * | 10/2001 | DeSantis et al. | ............ | 455/436 |
| 6,411,798 B1 * | 6/2002 | Frenkel et al. | ........... | 455/67.14 |

* cited by examiner

*Primary Examiner*—Temica Beamer
*Assistant Examiner*—Joy K. Contee
(74) *Attorney, Agent, or Firm*—Ryan, Mason & Lewis, LLP

(57) ABSTRACT

The present invention provides an apparatus and system for accurately predicting and evaluating cellular system performance before an actual system is installed at a site. In accordance with an embodiment of the invention, only two persons (or under certain conditions, as few as one) are required to operate the portable measurement and antenna placement (MAP) tools of the invention, and evaluate system performance (e.g., voice quality) at varied locations of a site without the system being in place. A user can measure out the size of cells using a bar graph display that shows the range of acceptable signal levels for the system, and an audible warning tone that signals the user when the cell edge has been exceeded. In addition, other quality determinative system parameters (e.g., bit error rate (BER), etc.) can be evaluated simultaneously with voice quality and average received signal strength.

43 Claims, 8 Drawing Sheets

DEFAULT MENU FORMAT

MAP STATUS MENU FORMAT

SETUP MENU

DIAGNOSTICS MENU

BATTERY MENU

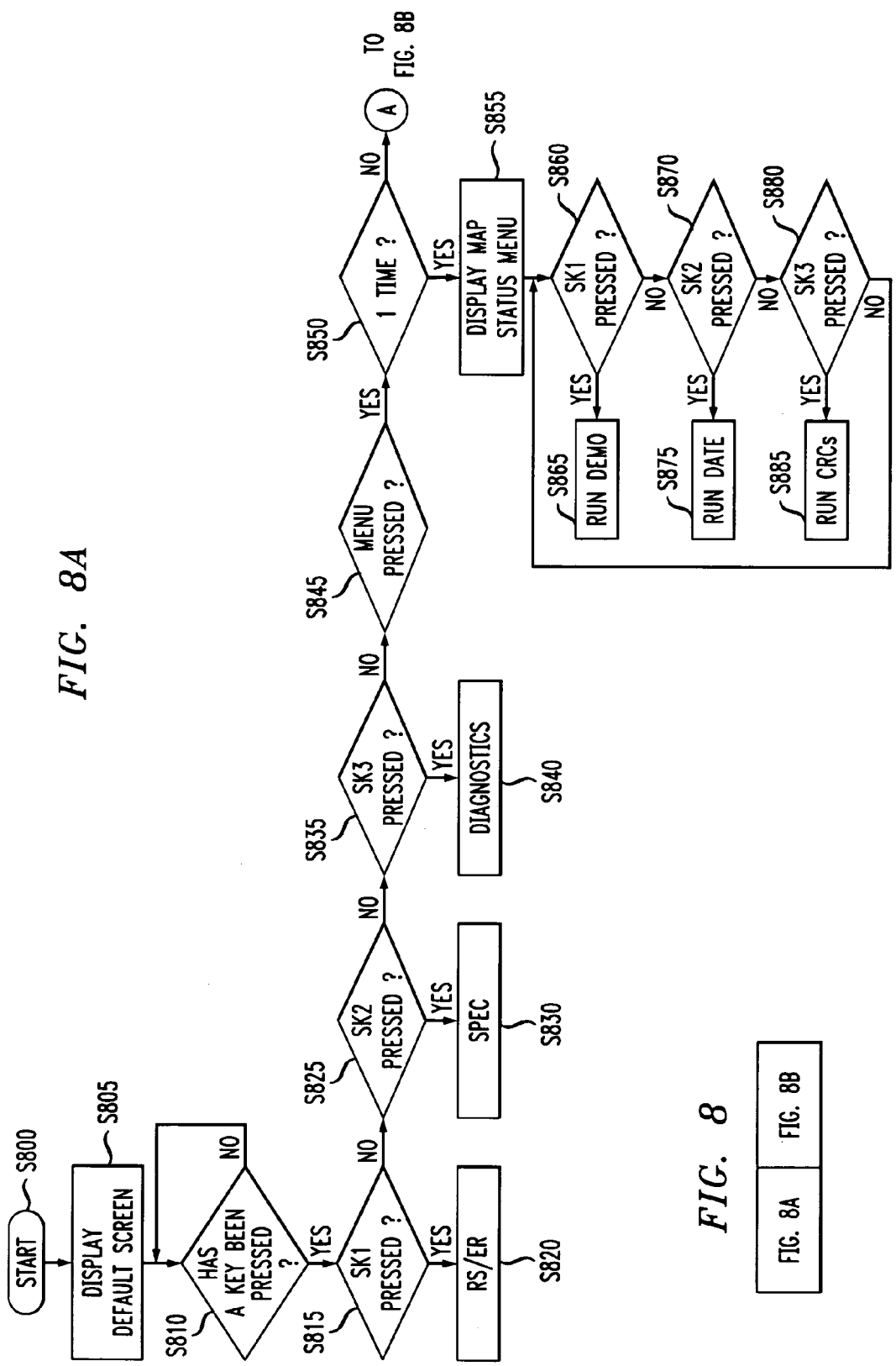

MEASUREMENT AND ANTENNA PLACEMENT TOOL FOR ESTABLISHING A CELL SITE

BACKGROUND OF THE INVENTION

1. Field of the Invention

The present invention relates to the field of cellular communication systems. More specifically, it relates to a device for establishing cells at a predetermined geographic site and for predicting the performance of the cells before an actual cellular system has been implemented at the site.

2. Description of the Related Art

A wireless, cellular telephone system is a large, complex communication network, characterized by multiple users roaming throughout an extensive coverage area while communicating with others within the same coverage area, or some other coverage area.

FIG. 1, for example, illustrates a typical geographic site 100 intended to receive a wireless infrastructure (e.g., antennas, repeaters, etc.) and become part of the communications network. The geographic site 100 has a length X and a width Y, where X and Y may form an area of e.g., one square mile. Within geographic site 100, a plurality of cells (e.g., four cells) are formed to provide wireless coverage within the site 100, as depicted in FIG. 2. The functions of the communication network, such as frequency reuse and handoff between coverage cells that allow the user to roam with a wireless telephone, are transparent to the user. The design of the cell layouts, and antenna placements, that ensure such seamless operation usually involve extensive, on-site measurements of signal strength versus distance from e.g., a system antenna, or complex electromagnetic modeling of the site, or some combination of these methods.

For example, electromagnetic modeling can be performed using a design aid such as the Wireless System Engineering (WiSE©)) computer-based tool. In order for such electromagnetic modeling to be useful, however, a lengthy checklist of data must be entered into the WiSE tool. For instance, the WiSE tool must be supplied with e.g., exact relative locations of walls, buildings, natural obstructions, etc. at the site 100 that might interfere with the transmission of signals within the site 100. In addition, the WiSE tool must be supplied with the material make-up of these objects so that a determination of the electromagnetic properties of the obstructions can be made. Once the WiSE tool has sufficient information, it can determine the optimum antenna location(s) at the site 100.

While the above described method is reliable, the collection of the critical data is very tedious. Moreover, problems often arise after the system has been installed due to sources of interference that were not considered or that did not exist during the information gathering (i.e., site examination) phase, or due to human error in measuring and/or estimating signal obstructions and/or material make-up. As a result, many problems associated with the modulation, data rates, or protocols of systems go undiscovered until the full system infrastructure is installed at a site. For example, holes (i.e., areas through which a signal is not being transmitted) in the coverage area due to e.g., incomplete surveys, can require costly additions or moves of system infrastructure. The costs associated with correcting these types of problems on site can be enormous and prohibitive. Thus, there exists a need for an apparatus and system for accurately predicting and evaluating cellular system performance before an actual cellular system is installed at a site.

SUMMARY OF THE INVENTION

The present invention overcomes the problems associated with the prior art and provides an apparatus and system for accurately predicting and evaluating cellular system performance before an actual system infrastructure is installed at a site. In accordance with an embodiment of the invention, only two persons (or under certain conditions, as few as one) are required to operate the portable measurement and antenna placement (MAP) tools of the invention, and evaluate system performance (e.g., voice quality, RSSI, etc.) at a site without the system being in place. A user can measure out the size of cells using a bar graph display that shows the range of acceptable signal levels for the system, and an audible warning tone that signals the user when the cell edge has been exceeded. In addition, other quality determinative system parameters (e.g., bit error rate (BER), etc.) can be evaluated simultaneously with voice quality and average RSSI.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF A PREFERRED EMBODIMENT

A preferred embodiment of the present invention will now be described with reference to FIGS. 3–8. Other embodiments may be realized and structural, or logical changes may be made to the disclosed embodiment without departing from the spirit or scope of the present invention.

Figure 3:
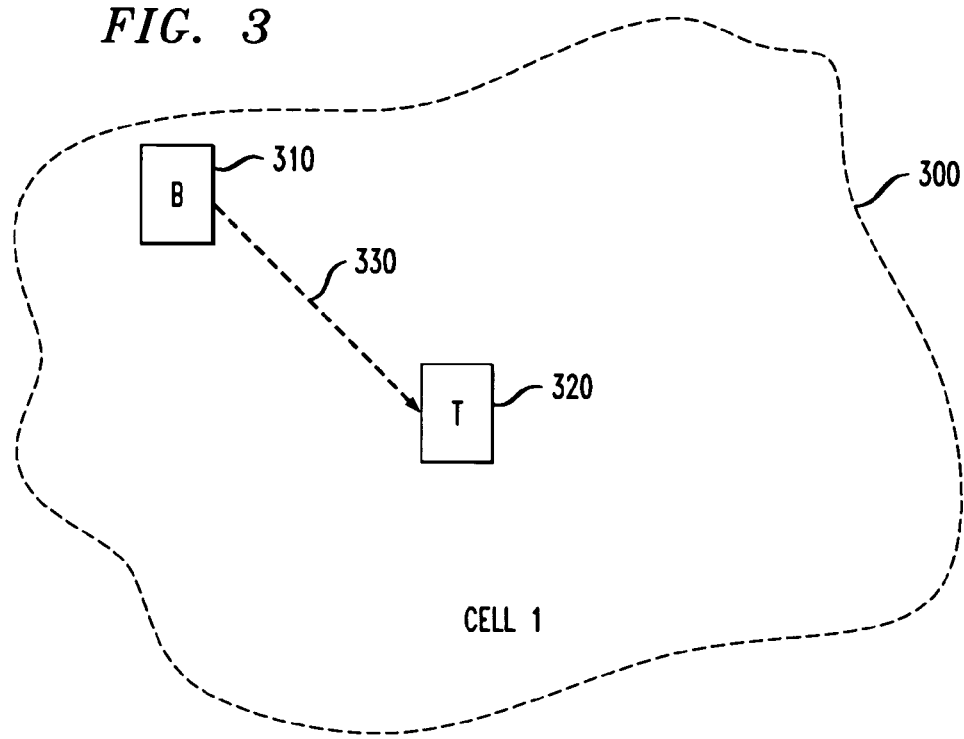
FIG. 3 illustrates a cell being formed with a pair of MAP tools, in accordance with an embodiment of the invention.

FIG. 3 depicts a cell 300 being formed in accordance with an embodiment of the invention. The measurement and antenna placement (MAP) tool device consists of two identical units; a base unit 310 and a terminal unit 320. That is, the MAP tools 310, 320 are intended to be used in pairs and are configured via firmware into a master/slave arrangement, whereby the base unit 310 acts as a master unit, providing a master timing reference signal and transmitting a test signal and the terminal unit 320 acts as a slave, aligning itself to the master timing and receiving the test signal and measuring the quality of the received test signal. It should be noted that either one of the identical units 310, 320 can be configured to perform either function (i.e., master or slave), but there must be one master and at least one slave in a MAP tool pairing. Note also, that both units are in a continuous transmit/receive configuration for full-duplex communication. In addition, multiple terminal units 320 (i.e., slave units) may be used with a single base unit 310 (i.e., master unit) to reduce the time required for cell formation.

Figure 1:
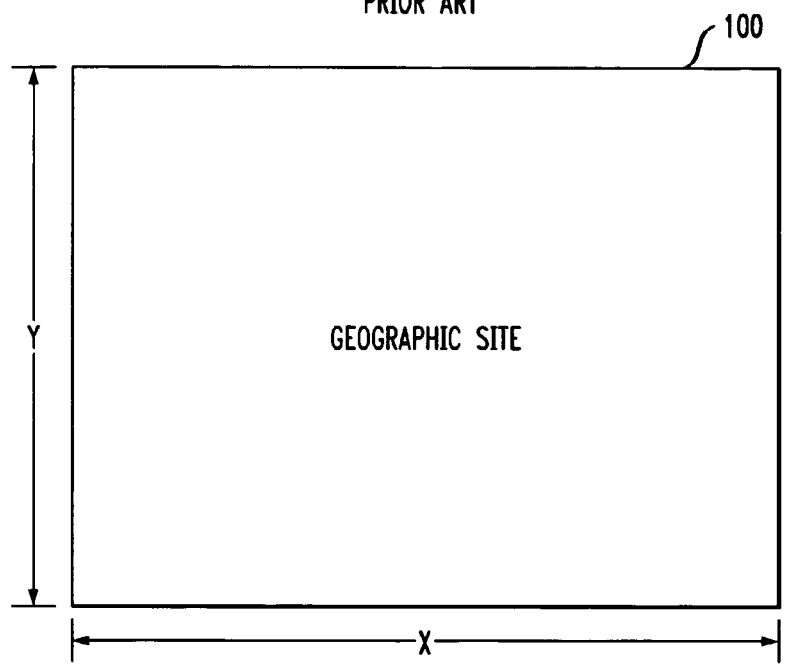
FIG. 1 illustrates a typical geographic site intended to receive a cellular system infrastructure.
Figure 2:
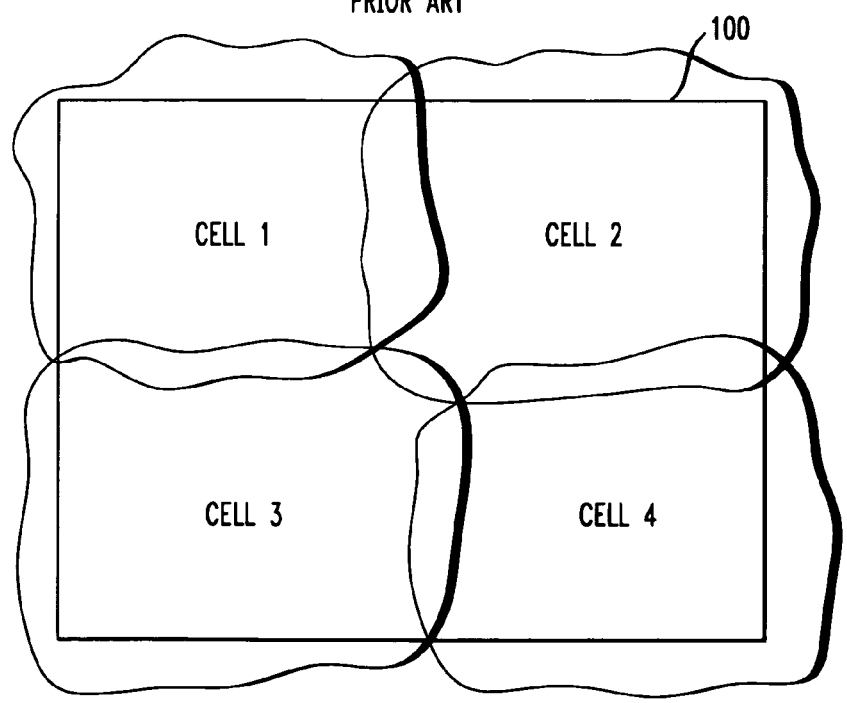
FIG. 2 illustrates the FIG. 1 geographic site having four separate cells of wireless coverage.

During cell formation, a base unit 310 is placed in a corner of a geographic site (e.g., 100 of FIGS. 1 and 2) and a terminal unit 320 is placed next to the base unit 310. Of course, the base unit may also be placed at a location just outside of a previously formed cell in preparation for forming an additional cell. A test signal 330 (e.g., a voice signal) is wirelessly transmitted (e.g., RF transmission) from the base unit 310 to the terminal unit 320, where the terminal 320 measures the signal strength and calculates a plurality of signal parameters indicative of the quality of the received signal. These parameters include e.g., peak and average received signal strength indication (RSSI), average bit error rate (BER), and the presence of preexisting microwave energy which may present a source of signal interference in the desired transmission frequency range. In addition, a user of the terminal unit 320 may listen to, and evaluate the audible quality of, the signal (e.g., voice signal) being received from the base unit 310. Although such a determination is subjective to the user, it is usually only a supplement to objective quality indicators (e.g., RSSI). Because of the full duplex nature of the communication, a user at the base unit can also provide a subjective evaluation of voice quality as well as objective measurements of signal quality, e.g., RSSI, BER, etc. Full duplex measurements are useful in evaluating sites for non-reciprocal distortion effects such as localized interference.

The terminal unit 320 is moved away from the base unit 310 along a path where a center of the cell is likely to be located until a lower threshold of signal strength (e.g., −65 dBm) is received by the terminal 320. The lower threshold is a predetermined value of acceptable signal strength and, of course, may vary from site to site. When the lower threshold is reached, it is presumed that a cell center and one radius has been established, the radius being approximately the distance of wireless link 330.

Figure 4:
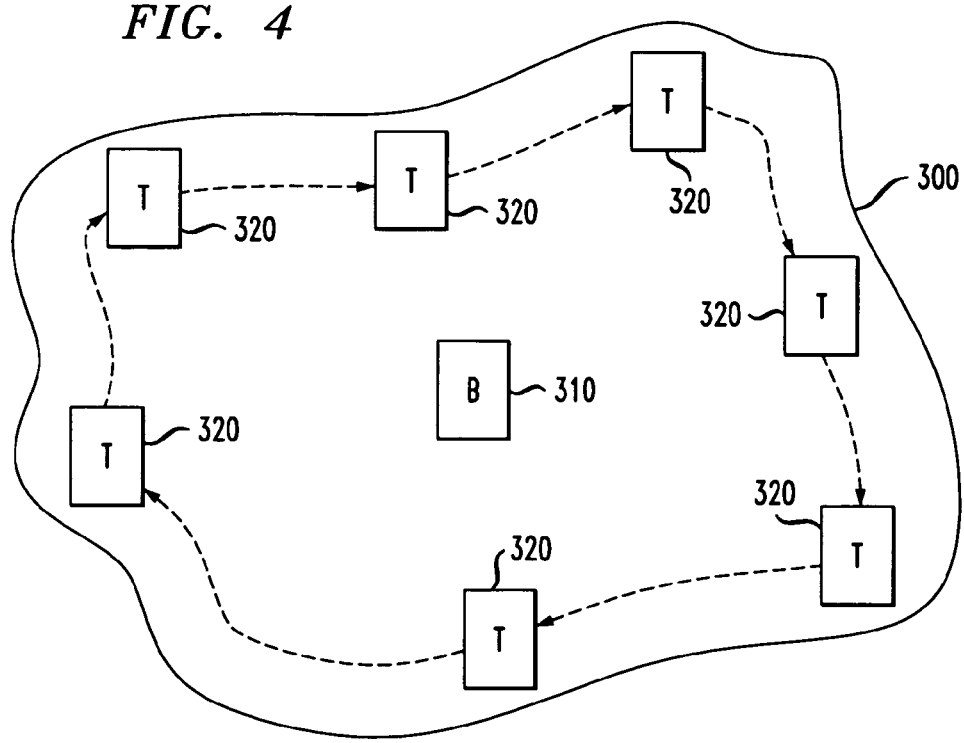
FIG. 4 illustrates a cell's boundaries being established, in accordance with an embodiment of the invention.

Turning now to FIG. 4, the base 310 is now depicted in the approximate center of the cell 300, and terminal 320 is located at an edge of the cell (i.e., base 310 is now located approximately where terminal 320 was located in FIG. 3, and vice versa). Terminal 320 is then moved to a next circumferential location on a proposed perimeter of the cell 300 while base 310 transmits a wireless test signal (e.g., similar to that of FIG. 3) to the terminal 320. The terminal 320 is then moved closer to or farther away from base 310 until another edge of cell 300 is reached as indicated by the terminal 320 reading a signal strength of less than e.g., −65 dBm or some other predetermined threshold level of signal strength. In an embodiment of the invention, the user is provided with an audible indication (e.g., an alarm) and a visual aid (e.g., a bar graph) upon receiving a test signal that is below the predetermined threshold level. In addition, the terminal unit 320 user may assess the audible quality of the received signal. This process of moving terminal 320 circumferentially around the base 310 and adjusting the distance of terminal 320 from base 310 until the predetermined threshold is reached is repeated until terminal 320 has been moved 360 degrees around the base 310. Having been moved 360 degrees around the base unit 310, when terminal 320 reaches its original location, a cell 300 has been formed. That is, a plurality of circumferential points and associated distance measurements have been accumulated which define a cell boundary. Using this technique, a cell 300 has been formed, wherein all obstructions have already been accounted for, including their material makeup, and no further calculations and/or modeling are necessary for establishing the cell 300. During this cell determination procedure, a second user at the base can be supplying uplink performance information, as well, to further aid in defining a cell boundary.

Figure 5:
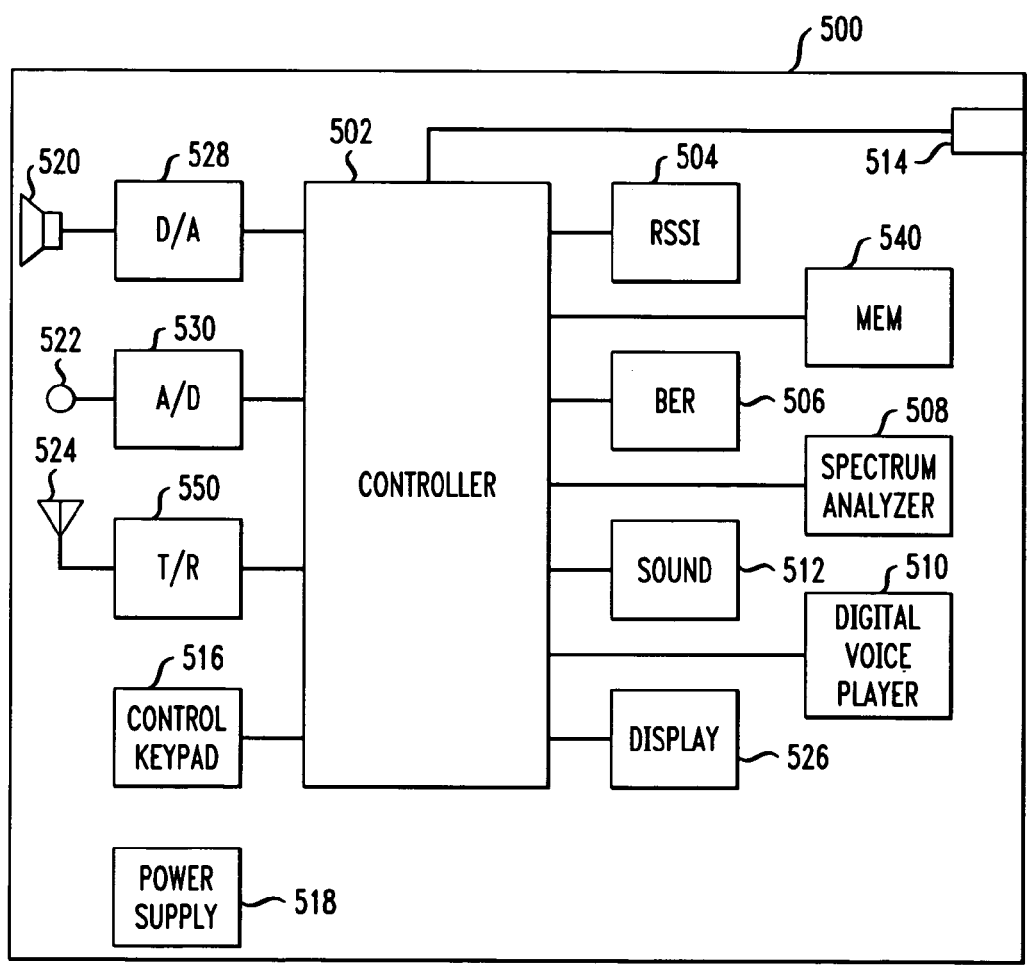
FIG. 5 illustrates a simplified block diagram of circuitry included within a MAP tool, in accordance with an embodiment of the invention.

Turning now to FIG. 5, a simplified block diagram of circuitry located within an embodiment of a MAP tool 500 is depicted. In one embodiment of the invention, the base 310 and terminal 320 each contain identical circuit block diagrams with differently configured firmware, however, it should be readily apparent that the base 310 and terminal 320 may be configured differently at the hardware level as well, for example, a base unit 310 can be configured as a transmitter only and a terminal 320 can be configured as a receiver only, or vice versa.

Centrally located within MAP tool 500 is a controller 502 for controlling the receipt, transmission, measurement and evaluation of test signals during the cell formation process described in connection with FIGS. 3 and 4. It should be readily apparent that the functions performed by controller 502, as described below, may be carried out with a processor, e.g., a digital signal processor (DSP), a central processing unit (CPU), an application specific integrated circuit (ASIC), digital logic arrays, etc.

Coupled to controller 502 is an RSSI meter 504 (part of the radio receiver 610 of FIG. 6) for measuring peak and/or average received signal strength of the test signal. Also coupled to controller 502 is a BER meter 506 (part of both the transmitter (605 of FIG. 6) and receiver 610 of the telephone unit 600) for measuring bit errors that have occurred during a measured time period. A spectrum analyzer 508 (another receiver-related function) is also coupled to controller 502 for measuring preexisting sources of microwave energy in the proposed cell site so that a determination may be made as to whether that energy might pose an interference problem for the transmission of signals within an actual cell.

A digital voice player 510 is coupled to controller 502 for playing prerecorded voice messages from a base unit to a terminal unit (and vice versa, if selected) so that cell formation is made possible with only one user (e.g., the one user is operating the terminal unit 320 while moving circumferentially around and radially of a stationary base unit 310 within a proposed cell site as described in connection with FIGS. 3 and 4). The prerecorded voice message may consist of "calibrated" voice passages. These "calibrated" voice passages can be evaluated off-line in connection with determining channel distortion characteristics. Also coupled to controller 502 is a sound card 512 for providing the user with audible indications (e.g., an alarm) and a display 526 for providing the user with textual and graphical indications.

A speaker 520, over which voice messages that are received from another MAP tool (i.e., both real time and prerecorded) and audio indications are played for the user, is coupled to a digital to analog (D/A) converter 528, which is in turn coupled to controller 502. A microphone 522 is coupled to an A/D converter, which is in turn coupled to controller 502 for transmitting voice signals from a user for wireless transmission to another MAP tool. An antenna 524, connected to a radio transmitter/receiver 550, is coupled to controller 502 for transmitting/receiving voice signals to/from another MAP tool.

In an embodiment of the invention, a pair of essentially identical antennas 524 are employed in both the base and terminal units. The antennas are physically separated and may also have different field polarizations to aid antenna diversity performance, as is well known in the art. Either the base unit 310 or the terminal unit 320 may be configured with an antenna diversity feature in order to help smooth out signal variations caused by multipath variations. The MAP tool's 500 ability to perform the diversity function provides an accurate representation of an actual wireless communication system environment.

The MAP tool 500 may be configured to allow selection of either of the antennas (e.g., antenna A or antenna B) or both (for diversity operation) on either end of a wireless link (i.e., transmitting or receiving).

Moreover, it should be noted that such antenna selectability allows an analyst to determine wave propagation characteristics, such as severity of multipath delay spread, signal blockages, etc. on site by examining performance changes between a single antenna (e.g., A) and diversity antennas (e.g., A and B).

A control keypad 516 is coupled to controller 502 for providing a user with means for inputting operating commands to the MAP tool 500. A power supply 518 is incorporated within MAP tool 500 for providing portability. The power supply 518 may be e.g., a dc power supply operating under battery power. A computer port connection 514 (e.g., a serial port) is coupled to controller 502 for providing a means for transmitting/receiving data captured by the MAP tool 500 to/from a separate computer station for additional cell modeling as may be desired. For example, a user might use the MAP tool in combination with a WiSE tool for accurately determining optimum antenna placement. The user is required to input only information regarding the location of obstructions in addition to the cell defining measurements discussed above for the WiSE tool to even more accurately define the cell 300 boundaries. That is, the WiSE tool uses the location of obstruction information in combination with the measurements taken by the MAP tool to provide optimum antenna placement for cell 300.

The data captured by the MAP tool (e.g., received signal quality relative to distance from the base unit) is stored in memory 540 (e.g., RAM) until it is required for the purpose of fine tuning antenna placement within the intended cell site. From memory 540, the data may be transferred to e.g., the WiSE tool via the port connection 514. The stored data reflects e.g., RSSI readings as a function of distance from the transmitter (i.e., the base). The terminal MAP tool is configured such that the user can enter the distance between the terminal and the base upon reading a minimum acceptable quality level (e.g., −65 dBm). It should be noted that this manual procedure can be automated such that the MAP tool is configured to detect its relative position from the base as it records its measurements.

Figure 6:
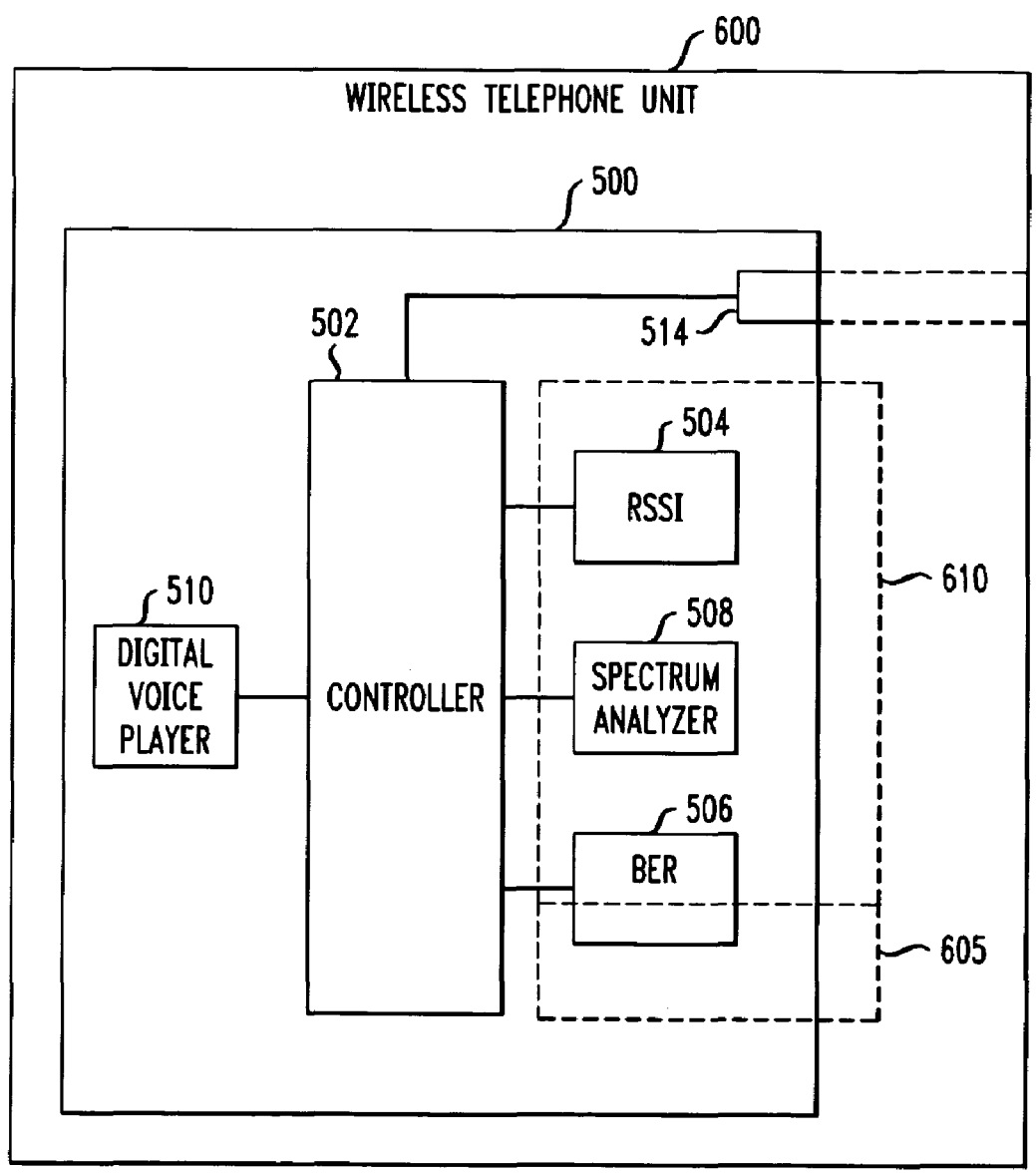
FIG. 6 illustrates the FIG. 5 block diagram of circuitry included within a wireless telephone unit, in accordance with an embodiment of the invention.

Turning now to FIG. 6, a wireless telephone unit 600 is depicted as containing the FIG. 5 block diagram (i.e., MAP tool 500). It should be readily apparent that although those features commonly found on a wireless telephone unit are not depicted within FIG. 6 for purposes of simplicity, wireless telephone unit 600 does contain such features (e.g., a microphone, an alphanumeric keypad, etc.). In addition, telephone unit 600 contains a radio transmitter 605 and a radio receiver 610. The purpose of FIG. 6 is to demonstrate the desirability of including a MAP tool 500 within a wireless telephone unit 600.

Turning now to FIG. 7, several different available menu options included on an embodiment of the MAP tool will be described. The MAP tool operates using time division multiple access (TDMA) technology. TDMA technology, being well known in the art, allows multiple time slots to be used for the transmission/reception of multiple conversations at a given carrier frequency (e.g., 1.9 GHz). That is, within a given frequency, up to e.g., twelve different full duplex conversations (i.e., twelve different conversations involving up to twenty four time slot pairs) can occur as consecutive conversations compressed and stacked in time next to each other and sent over the same frequency. Upon receipt, the signals are then decompressed and destacked for playback. The compressed consecutive conversations amount to different time slots within which information may be transmitted/received. Although the invention is being described for exemplary use with a TDMA system, it should be apparent that the invention can be used with any type of channelized cellular system, e.g., AMPS, CDMA, GSM, PCS, etc. operating at any cellular or PCS frequencies.

For example, a user may operate a first MAP tool as a base unit to transmit a real time voice signal to a second MAP tool being used as a terminal unit. The voice signal may be transmitted over a first channel, e.g. time slot and e.g., the MAP tool may be performing a bit error rate (BER) measurement of that voice signal over a second channel, i.e. time slot.

As depicted in FIGS. 7(a)–(e), an embodiment of MAP tool 500 contains three soft keys SK1, SK2, SK3 from left to right on a front panel 710. In addition, a MENU key 700 is located in close proximity to the soft keys SK1, SK2, SK3. The functions of these keys (i.e., SK1, SK2, SK3 and MENU 700) will be described more fully below in connection with FIG. 8.

Figure 7A:
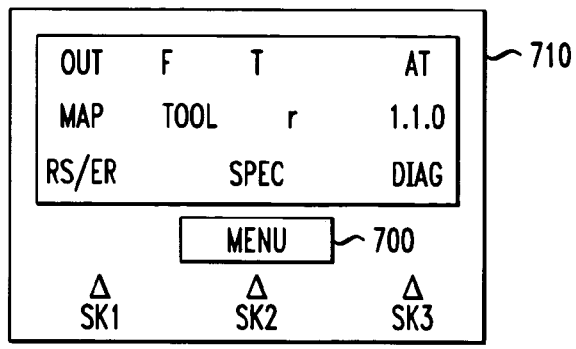
FIG. 7(a) illustrates a default menu display of a MAP tool, in accordance with an embodiment of the invention.

FIG. 7(a) depicts a default menu as it appears on display 526 of MAP tool 500. As depicted, the default screen contains three rows of information. The top row of the display shows, from left to right: 1) the synchronization/call state of the MAP tool 500 (e.g., "IN" for in sync, "OUT" for temporarily out of sync while on an active call, and "IDL" for not on an active call), 2) the frequency, 3) the time slots of the MAP tool (e.g., the frequency is displayed as a channel number from 0 to 7, the time slot number is displayed as a slot number from 0 to 23), 4) the selected antenna (e.g., A or B), and 5) either base or terminal ("B" or "T") for the selected mode of operation.

The middle row shows the version of the MAP tool firmware being run (e.g., "r 1.1.0"). During a call, in accordance with an embodiment of the invention, when the RSSI is approximately 4 dB above the predetermined cell threshold signal level (e.g., −65 dBm), the middle line is replaced by a horizontal bar graph (not shown) which provides a visual aid to the user that an edge of the cell is being approached. In addition, an audible alarm is sounded to alert the user of the approaching cell edge. The MAP version line reappears when the signal once again exceeds the predetermined value (e.g., 4 dB) above the threshold level.

The bottom row shows three soft key selectable functions: 1) "RS/ER" is depicted for received signal strength or bit error rate measurement where the MAP tool defaults to taking a new measurement (RSSI and BER) every 12 seconds, 2) "SPEC" is displayed for spectrum analyzer measurement, and 3) "DIAG" is displayed for diagnostic error rate which takes RSSI, BER and other error measurements every 1 second.

Figure 7B:
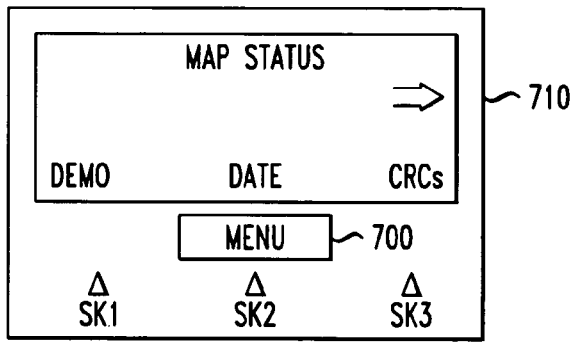
FIG. 7(b) illustrates a status menu display of a MAP tool, in accordance with an embodiment of the invention.

FIG. 7(b) depicts a MAP tool status menu showing three additional functions: 1) "DEMO," 2) "DATE," and 3) "CRCs." Each of these three functions can be performed by pressing the appropriate arrow key just beneath the desired function. The "DEMO" function displays a series of display screens normally found on e.g., a standard DEFINITY® Wireless Business System (DWBS) as manufactured by Lucent Technologies, Inc. The "DATE" function displays the type of MAP tool and firmware version number and date. The "CRCs" shows various check sums associated with the firmware version in use.

Figure 7C:
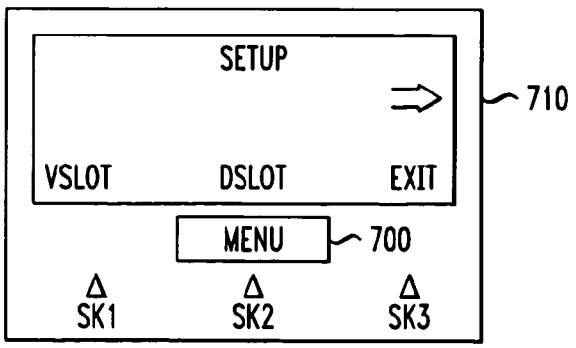
FIG. 7(c) illustrates a setup menu display of a MAP tool, in accordance with an embodiment of the invention.

FIG. 7(c) depicts a MAP tool setup menu showing three additional functions: 1) "VSLOT," 2) "DSLOT," and 3) "EXIT." The "EXIT" function returns the user to the default display (of FIG. 7(a)). The "VSLOT" function allows the user to change the parameters used to govern the voice slot. The "DSLOT" function allows the user to change the parameters used for the data slot. That is, the actual slot contents (e.g., preamble, A-field, B-field, etc.) may be modified by the user.

Figure 7D:
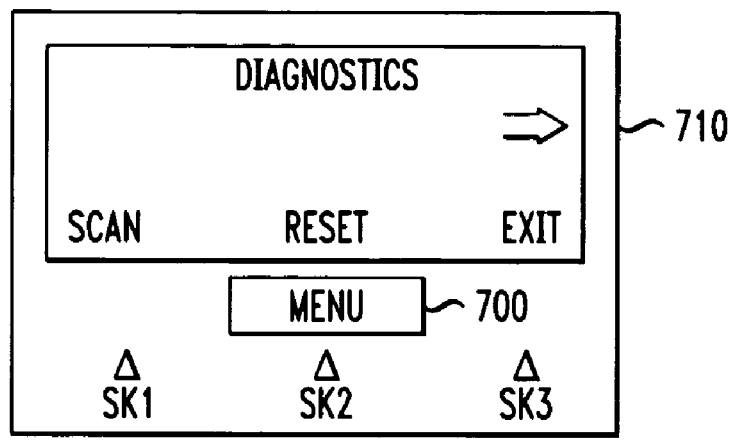
FIG. 7(d) illustrates a diagnostics menu display of a MAP tool, in accordance with and embodiment of the invention.

FIG. 7(d) depicts a MAP tool diagnostics menu containing three additional functions: 1) "SCAN," 2) "RESET," and 3) "EXIT." The "EXIT" function returns the user to the default display (of FIG. 7(a)). The "SCAN" function shows the user diagnostic information about the time slots available on the frequency that is in use. The "RESET" function restarts the MAP tool in a manner equivalent to removing and then reinserting the battery.

Figure 7E:
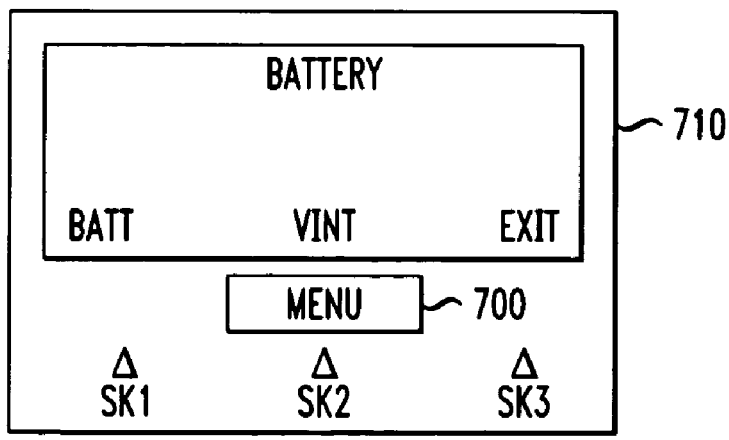
FIG. 7(e) illustrates a battery menu display of a MAP tool, in accordance with an embodiment of the invention.

FIG. 7(e) depicts a MAP tool battery menu containing three additional functions: 1) "BATT," 2) "VINT," and 3) "EXIT." The "EXIT" function returns the user to the default screen (of FIG. 7(a)). The "BATT" function displays the current battery voltage. The "VINT" function displays the hardware vintage of the terminal that is being used.

Figure 8B:
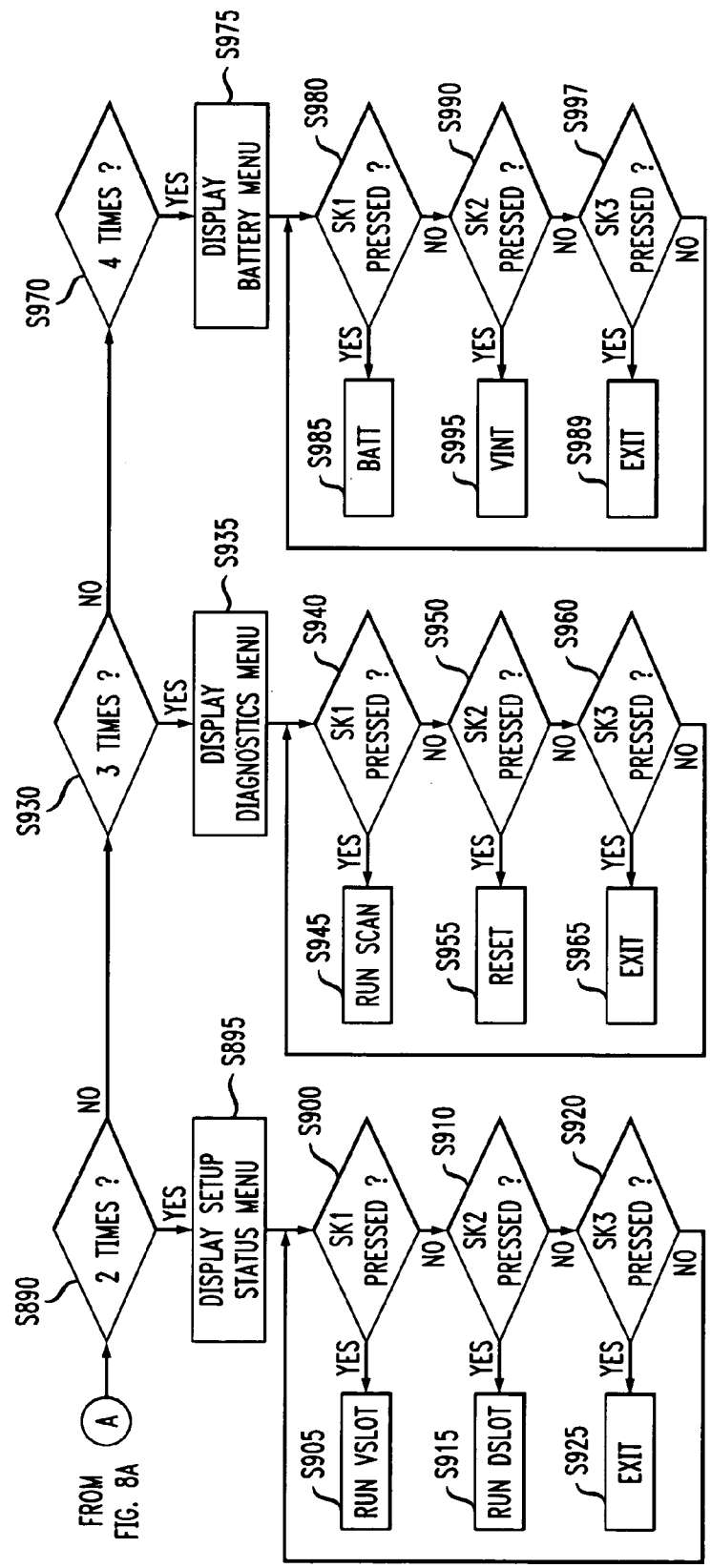
FIG. 8 illustrates an exemplary flowchart of functions performed by a MAP tool, in accordance with an embodiment of the invention.

FIG. 8 illustrates an exemplary flowchart of an order of operations performed by a MAP tool 500, in accordance with an embodiment of the invention. At step S800, the MAP tool is powered up and a default screen is displayed at step S805.

At step S810, a determination is made as to whether a key has been pressed. If not, MAP tool 500 will continue to display the default menu and inquire once again at step S810. If a key has been pressed, controller 502 determines which key was pressed.

At step S815, controller 502 determines whether SK1 was pressed; if it was, the RS/ER function is performed at step S820. If SK1 was not pressed, controller 502 determines whether SK2 was pressed; if it was, the SPEC function is performed at step S830. If SK2 was not pressed, controller 502 determines whether SK3 was pressed; if it was, the DIAG function is performed at step S840. If SK3 was not pressed, controller 502 determines that the MENU button 700 was pressed at step S845.

At step S850, controller 502 determines whether MENU 700 was pressed one time; if it was, a map status menu is displayed at step S855. If MENU 7 was not pressed one time, controller 502 determines whether MENU 700 was pressed twice at step S890; if it was, a set up status menu is displayed at step S895. If MENU 700 was not pressed twice, controller 502 determines whether MENU 700 was pressed three times at step S930; if it was, a diagnostic menu is displayed at step S935. If MENU 700 was not pressed three times, controller 502 concludes that MENU 700 was pressed four times at step S970, and a battery menu is displayed at step S975.

At step S860, while the MAP status menu is displayed, controller 502 determines whether SK1 has been pressed at step S860. If it was, the DEMO function is run at step S865; if it was not, controller 502 determines whether SK2 was pressed at step S870. If it was, the DATE function is run at step S875; if it was not, controller 502 determines whether SK3 was pressed at step S880. If it was, the CRCs function is run at step S885; if it was not, controller 502 returns to its inquiry at step S860.

Still referring to FIG. 8, at step S900, while the set up status menu is displayed, controller 502 determines whether SK1 was pressed. If it was, the VSLOT function is run at step S905; if it was not, controller 502 determines whether SK2 has been pressed at step S910. If it was, the DSLOT function is run at step S915; if it was not, controller 502 determines whether SK3 was pressed at step S920. If it was, the EXIT function is run at step S925; if it was not, controller 502 returns to its inquiry at step S900.

At step S940, while the diagnostics menu is displayed, controller 502 determines whether SK1 has been pressed. If it was, the SCAN function is run at step S945; if it was not, controller 502 determines whether SK2 was pressed at step S950. If it was, the RESET function is run at step S955; if it was not, controller 502 determines whether SK3 has been pressed at step S960. If it was, the EXIT function is performed at step S965; if it was not, controller 502 returns to its inquiry at step S940.

At step S980, while the battery menu is displayed, controller 502 determines whether SK1 has been pressed. If it was, the BATT function is run at step S985; if it was not, controller 502 determines whether SK2 has been pressed at step S990. If it was, the VINT function is run at step S995; if it was not, the controller 502 determines whether SK3 has been pressed at step S997. If it was, the EXIT function is run at step S999; if it was not, the controller 502 returns to its inquiry at step S980.

In accordance with an embodiment of the invention, an apparatus and system are provided for accurately predicting and evaluating cellular system performance before an actual cellular system infrastructure is installed at a site.

While a preferred embodiment of the invention has been described and illustrated, it should be apparent that many modifications can be made to the invention without departing from its spirit or scope. For example, although FIGS. 7(a)–(e) depict specific menu screens and functions, many other functions can be added or subtracted as long as the purpose of the device is to provide an accurate assessment as to the quality of cellular service in a chosen site and/or to assist with the placement of antennas and/or repeaters for establishing that cellular service, it does not depart from the spirit and scope of the preset invention. In addition, while an exemplary flow chart is depicted in FIG. 8, it should be readily understood that the specific order of steps is not critical to the invention, and therefore, may be modified without departing from the invention.

Furthermore, while the MAP tool device of the invention has been described in connection with evaluating and establishing cellular sites, it should be readily apparent that the device may be used for evaluating and establishing both outdoor and indoor cellular sites (such as e.g., the DWBS) with equally good results. Accordingly, the invention is not limited by the foregoing description or drawings, but is only limited by the scope of the appended claims.

What is claimed as new and desired to be protected by Letters Patent of the United States is:

1. A method for establishing a cell site comprising:
   a) transmitting a wireless signal from a transmitter at a first location to a receiver, wherein said first location is approximately a center of an intended cell site;
   b) receiving said wireless signal at said receiver at another location spaced by a distance from said first location;
   c) measuring at least one quality determinative parameter of said wireless signal as received for a predetermined minimum quality level as said distance changes; and
   d) recording said distance associated with an identifier of said another location when said at least one quality determinative parameter falls to or below said predetermined minimum level;
   wherein said transmitter and receiver are configured to support full duplex voice communication therebetween; and
   wherein said receiver comprises selection circuitry configured to permit selection of said at least one quality determinative parameter for measurement from a plurality of quality determinative parameters measurable at said receiver, said plurality of quality determinative parameters comprising at least two of average signal strength, peak signal strength, bit error rate and spectrum analysis.

2. The method as in claim 1 further comprising:
   e) moving said receiver circumferentially relative to said first location to another location and repeating steps (b) through (d).

3. The method as in claim 2 further comprising repeating steps (b) through (e) for a plurality of circumferentially spaced locations until a 360 degree are around said first location is completed.

4. The method as in claim 1, wherein said act of measuring comprises measuring received signal strength.

5. The method as in claim 4, wherein said act of measuring comprises measuring peak received signal strength.

6. The method as in claim 4, wherein said act of measuring comprises measuring average received signal strength.

7. The method as in claim 1, wherein said act of measuring comprises assessing audible quality of said received wireless signal.

8. The method as in claim 1, wherein said act of measuring comprises measuring a bit error rate of said wireless signal.

9. The method as in claim 3 further comprising measuring for preexisting sources of microwave energy at each of said circumferentially spaced location.

10. The method as in claim 6, wherein said predetermined minimum level of average signal strength is approximately −65 dBm.

11. The method as in claim 1 further comprising providing an audible indication to a user that said wireless signal is being received at or below said predetermined minimum level of said at least one quality determinative parameter.

12. The method as in claim 1 further comprising providing a visual indication to a user that said wireless signal is being received at or below said predetermined minimum level of said at least one quality determinative parameter.

13. The method as in claim 3 further comprising:
   using the recorded distances and location identifiers to determine a cell site boundary; and
   fine tuning an optimum antenna location within said cell site boundary.

14. The method as in claim 13, wherein said act of fine tuning further comprises:
   receiving data of obstructions within said cell site at a processor-based antenna placement tool;
   receiving said recorded distance and location information associated with said location identifiers at said processor-based antenna placement tool;
   processing said obstruction data and said distance and location information within said processor-based antenna placement tool; and
   establishing a finely tuned optimum antenna location for said cell site.

15. The method as in claim 14, wherein said processor-based antenna placement tool is a wireless system engineering (WiSE) tool.

16. The method as in claim 1 further comprising, prior to performing step (a), performing the steps of:
   transmitting a wireless signal from a location which is close to a desired boundary of said cell site;
   receiving said wireless signal at said receiver located along a path which is expected to pass through an approximate center of said cell site;
   measuring at least one quality determinative parameter of said wireless signal for a predetermined minimum quality level as said receiver is moved along said path away from said transmitter;
   recording a second distance of said receiver from said location close to said cell boundary when said at least one quality determinative parameter falls to or below said predetermined minimum level;
   placing said transmitter at said second distance; and then performing steps (a) through (d).

17. The method as in claim 16, wherein said act of measuring as said receiver is moved along said path comprises measuring received signal strength.

18. The method as in claim 17, wherein said act of measuring as said receiver is moved along said path comprises measuring peak received signal strength.

19. The method as in claim 17, wherein said act of measuring as said receiver is moved along said path comprises measuring average received signal strength.

20. The method as in claim 16, wherein said act of measuring as said receiver is moved along said path comprises measuring audible quality of said wireless signal.

21. The method as in claim 16, wherein said act of measuring as said receiver is moved along said path comprises measuring a bit error rate of said wireless signal.

22. The method as claim 19, wherein said predetermined minimum level of average signal strength is approximately −65 dBm.

23. An apparatus for use in determining boundaries of a cell site, said apparatus comprising:
   a receiver for receiving a wireless signal transmitted from a first location;
   at least one measurement device coupled to said receiver for measuring at least one quality determinative parameter of said received wireless signal for a predetermined minimum quality level as said receiver is moved relative to said first location; and
   a recorder coupled to said at least one measurement device for recording said relative receiver location when said at least one quality determinative parameter falls to or below said predetermined minimum level;
   wherein said receiver is configured to support full duplex voice communication with a transmission device associated with said first location; and
   wherein said receiver comprises selection circuitry configured to permit selection of said at least one quality determinative parameter for measurement from a plurality of quality determinative parameters measurable at said receiver, said plurality of quality determinative parameters comprising at least two of average signal strength, peak signal strength, bit error rate and spectrum analysis.

24. The apparatus as in claim 23, wherein said at least one measurement device comprises a received signal strength indication meter.

25. The apparatus as in claim 23, wherein said at least one measurement device comprises a bit error rate meter.

26. The apparatus as in claim 23, further comprising a spectrum analyzer for measuring preexisting sources of microwave energy at said cell site.

27. The apparatus as in claim 23, wherein said at least one measurement device comprises a speaker for allowing a user to hear a received voice message.

28. The apparatus as in claim 24, wherein said predetermined minimum level of received signal strength is approximately −65 dBm.

29. The apparatus as in claim 23 further comprising a data transfer port coupled to said recorder through which said recorded data may be transferred to a separate processing device for fine tuning an optimum antenna location at said cell site.

30. The apparatus as in claim 23 wherein said transmission device associated with said first location comprises a transmitter for transmitting a wireless signal from said first location.

31. The apparatus as claim 30 further comprising a controller coupled to each of said receiver, said at least one measuring device and said recorder, said controller being configurable for controlling whether said apparatus is operable as a transmitter or a receiver.

32. The apparatus as claim 23 further comprising:
  a telephone device, said telephone device comprising:
    audio input means for inputting an audio signal for transmission; and
    audio output means for outputting a received audio signal.

33. The apparatus as in claim 23, wherein said recorder records a plurality of said locations associated with different circumferential points about said first location.

34. A system for establishing a cell site, comprising:
  a transmitter for transmitting a wireless signal from a first location to a second location,
  a receiver for receiving said wireless signal at said second location, said second location being spaced by a distance from said first location,
  said receiver containing at least one measurement device for measuring at least one quality determinative parameter of said wireless signal for a predetermined minimum level, and a data storage area for recording a distance between said transmitter and receiver when said predetermined minimum level is reached or exceeded;
  wherein said transmitter and receiver are configured to support full duplex voice communication therebetween; and
  wherein said receiver comprises selection circuitry configured to permit selection of said at least one quality determinative parameter for measurement from a plurality of quality determinative parameters measurable at said receiver, said plurality of quality determinative parameters comprising at least two of average signal strength, peak signal strength, bit error rate and spectrum analysis.

35. The system as in claim 34, wherein said at least one measurement device comprises a received signal strength indication meter.

36. The system as in claim 34, wherein said at least one measurement device comprises a bit error rate meter.

37. The system as claim 34, wherein said receiver further comprises a spectrum analyzer for measuring for preexisting sources of microwave energy at said cell site.

38. The system as in claim 34, wherein said receiver further comprises a speaker for enabling a user to hear a received voice message.

39. The system as in claim 34, wherein said receiver further comprises an audible indicator for notifying a user that said wireless signal is being received at or below said predetermined minimum level of said at least one quality determinative parameter.

40. The system as in claim 34, wherein said receiver further comprises a visual indicator for notifying a user that said wireless signal is being received at or below said predetermined minimum level of said at least one quality determinative parameter.

41. The system as in claim 34, wherein said data storage area records a plurality of said locations associated with different circumferential points about said first location.

42. The system as in claim 38, wherein said received voice message is a "calibrated" voice passage.

43. The system as in claim 42, wherein the "calibrated" voice passage can be stored for off-line evaluation of channel distortion characteristics.

* * * * *

UNITED STATES PATENT AND TRADEMARK OFFICE
CERTIFICATE OF CORRECTION

| | | |
|---|---|---|
| PATENT NO. | : 7,110,768 B1 | Page 1 of 1 |
| APPLICATION NO. | : 09/455019 | |
| DATED | : September 19, 2006 | |
| INVENTOR(S) | : S.D. Bridges et al. | |

It is certified that error appears in the above-identified patent and that said Letters Patent is hereby corrected as shown below:

In the Claims:

Column 9, line 33, please delete "are" and insert --arc--.

Column 10, line 46, after "as" please insert --in--.

Column 11, line 29, after "as" please insert --in--.

Column 11, line 34, after "as" please insert --in--.

Column 12, line 23, after "as" please insert --in--.

Signed and Sealed this

Nineteenth Day of December, 2006

JON W. DUDAS
*Director of the United States Patent and Trademark Office*